United States Patent
Braun et al.

(12)
(10) Patent No.: US 6,180,275 B1
(45) Date of Patent: *Jan. 30, 2001

(54) FUEL CELL COLLECTOR PLATE AND METHOD OF FABRICATION

(75) Inventors: James C. Braun, Juno Beach; John E. Zabriskie, Jr., Port St. Lucie; Jay K. Neutzler, Palm Beach Gardens; Michel Fuchs, Boynton Beach; Robert C. Gustafson, Palm Beach Gardens, all of FL (US)

(73) Assignee: Energy Partners, L.C., West Palm Beach, FL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/195,307

(22) Filed: Nov. 18, 1998

(51) Int. Cl.$^7$ ............................. H01M 8/64; H01M 8/10
(52) U.S. Cl. .................................. 429/34; 429/30
(58) Field of Search .................. 429/30, 40, 42, 429/34

(56) References Cited

U.S. PATENT DOCUMENTS

| | | | |
|---|---|---|---|
| 3,801,374 | 4/1974 | Dews et al. ............... 136/120 FC |
| 4,197,178 | * 4/1980 | Pellegri et al. ................. 204/255 |
| 4,214,969 | 7/1980 | Lawrance ...................... 204/255 |
| 4,414,142 | 11/1983 | Vogel et al. .................. 252/506 |
| 4,704,231 | 11/1987 | Chung ........................... 252/511 |
| 4,851,304 | * 7/1989 | Miwa et al. .................... 429/40 |
| 4,988,583 | 1/1991 | Watkins et al. .................. 429/30 |
| 5,798,188 | 8/1998 | Mukohyama et al. ............ 429/34 |
| 5,932,949 | * 8/1999 | Ziegler et al. ................. 310/236 |
| 5,942,347 | * 8/1999 | Koncar et al. ................... 429/30 |

* cited by examiner

*Primary Examiner*—Maria Nuzzolillo
*Assistant Examiner*—Monique Wills
(74) *Attorney, Agent, or Firm*—Akerman, Senterfitt

(57) ABSTRACT

An improved molding composition is provided for compression molding or injection molding a current collector plate for a polymer electrolyte membrane fuel cell. The molding composition is comprised of a polymer resin combined with a low surface area, highly-conductive carbon and/or graphite powder filler. The low viscosity of the thermoplastic resin combined with the reduced filler particle surface area provide a moldable composition which can be fabricated into a current collector plate having improved current collecting capacity vis-a-vis comparable fluoropolymer molding compositions.

138 Claims, No Drawings

FUEL CELL COLLECTOR PLATE AND METHOD OF FABRICATION

STATEMENT REGARDING FEDERALLY SPONSORED RESEARCH OR DEVELOPMENT

The United States Government has rights in this invention pursuant to Contract No. DE-FC02-97EE50476 between the United States Department of Energy and Energy Partners, Inc.

FIELD OF THE INVENTION

This invention relates generally to compositions and methods for fabricating electrically-conductive polymer composite structures and coatings, and more particularly to a highly-conductive graphite composite particularly suited for net shape molding a current collector plate for a fuel cell.

BACKGROUND OF THE INVENTION

Solid polymer electrolyte membrane (PEM) type electrochemical fuel cells are well known. Generally, PEM fuel cells comprise a membrane electrode assembly (MEA) and diffusion backing structure interposed between electrically conductive graphite current collector plates. In operation, multiple individual cells are arranged to form a fuel cell stack. When the individual cells are arranged in series to form a fuel cell stack, the current collector plates are referred to as bipolar collector plates. The collector plates perform multiple functions, including: (1) providing structural support; (2) providing electrical connection between cells; (3) directing fuel and oxidant reactants and/or coolant to individual cells; (4) distributing reactant streams and/or coolant within individual cells; (5) removing byproduct from individual cells; and (6) separating fuel and oxidant gas streams between electrically connected cells, In addition to being electrically conductive, collector plates must have good mechanical strength, high thermal stability, high resistance to degradation caused by chemical attack and/or hydrolysis, and low permeability to hydrogen gas.

Typically, collector plates have intricate patterns formed on their major surfaces. For instance, integral channels may be provided for directing fuel, oxidant and/or byproduct through the fuel cell. Historically, graphite structures have been machined to a desired configuration from graphite composite blanks. Due in part to the expense and time consuming nature of machining, more recent efforts in the fuel cell manufacturing industry have focused on the development of compositions and methods for producing net shape molded fuel cell structures, such as bipolar collector plates, using compression molding and injection molding techniques. These efforts, which have had limited success, have concentrated primarily on molding compositions incorporating fluoropolymer binder materials. For example, bipolar collector plates molded from thermoplastic fluoropolymers, such as vinylidene fluoride, are disclosed in U.S. Pat. Nos. 3,801,374, 4,214,969, and 4,988,583.

Compared to other polymeric materials, fluoropolymers have relatively high viscosities. Significantly, the relatively high viscosity associated with fluoropolymers limits their effectiveness as binder materials in molding and coating compositions.

In an effort to maximize the electrical conductivity of current collector plates for fuel cells, it is desirable to maximize electrically-conductive filler loading levels. Generally, as the percentage of filler particles in a given polymer composition is increased, there is a corresponding increase in the viscosity of the composition. Consequently, regardless of the polymer binder material chosen, the addition of electrically conductive filler must be limited to ensure some minimum degree of flow during processing. Such viscosity limitations are particularly pronounced in injection molding applications, where the viscosity of the polymer composition must be maintained at a low enough level to allow the composition to travel through intricate mold features such as channels and gates. In the case of fluoropolymer compositions, the high initial viscosity level associated with the fluoropolymer binder restricts the quantity of filler that can be loaded into the binder prior to processing. Consequently, the electrical conductivity of fuel cell collector plates fabricated using fluoropolymer binders is correspondingly limited.

For these and other reasons, there is a well-established need for improved compositions and methods for processing highly conductive composite structures for electronic, thermoelectric and electrochemical device applications.

SUMMARY OF THE INVENTION

It is an object of this invention to provide a composition for fabricating thermally- and electrically-conductive polymer composite structures and coatings for use in highly-corrosive environments, wherein the electrical conductivity of the resulting structure or coating is improved as a result of enhanced filler loading capacity of the composition.

It is another object of this invention to provide a composition, and a method for processing said composition, to form a thermally- and electrically-conductive polymer composite structure or coating for use in electronic, thermoelectric and electrochemical devices.

It is another object of this invention to provide a non-fluorinated composition for rapidly net shape molding a current collector plate for a polymer electrolyte membrane (PEM) fuel cell, wherein improved filler loading results in a current collector plate having a higher bulk electrical conductivity then conventional current collector plates fabricated from fluoropolymer-based compositions.

These and other objects of the invention are achieved with the novel compositions and methods of the present invention. Novel polymer compositions are provided for producing highly-conductive coatings and net shape molded structures for a variety of applications, including: corrosion-resistant electrical and thermal conductors and contacts; battery and capacitor electrodes; electrodes for electrochemical coating and synthesis of materials; and electrochemical device components, such as current collector plates for polymer electrolyte membrane (PEM) fuel cells.

Briefly, according to the invention, a highly-loaded polymer composition is provided for fabricating a structure or coating generally suitable for use in electronic, thermoelectric and electrochemical devices. In the preferred embodiment of the invention, the composition is particularly suited for compression molding and/or injection molding a current collector plate for a PEM fuel cell. The composition is comprised of a low viscosity polymer loaded with a chemically-inert, thermally and electrically conductive filler.

The polymer is chosen from the group of polymers having a melt viscosity of less than 1,000 Newton-seconds per square meter ($N*s/m^2$) over a shear rate range of 1,000 to 10,000 $sec^{-1}$. Furthermore, it is preferred that the polymer has material properties and characteristics as summarized in Table 2 (below). Suitable families of polymers include: polyphenylene sulfide (PPS); modified polyphenylene oxide (PPO); liquid crystal polymer (LCP); polyamide; polyimide; polyester; phenolic; epoxy-containing resin and vinyl ester.

The polymer composition is loaded with highly-conductive filler. In the preferred embodiment of the invention, the filler comprises carbon and/or graphite particles having an average particle size ranging from approximately 0.1 to 200 microns, and preferably in the range of about 23 to 26 microns. The filler particles have a surface area ranging from approximately 1 to 100 $m^2/g$, and preferably in the range of 7 to 10 $m^2/g$ (as measured by BET testing standards). The composition may include additional components, including: carbon and/or graphite nanofibers; carbon and/or graphite fibers; metal fibers such as stainless steel or nickel; and metal-coated carbon and/or graphite fiber concentrates having thermoplastic or thermoset sizing chosen from the aforementioned group of potential polymers.

The composition is subsequently formed into a desired shape by compression molding, injection molding, or a combination thereof. Alternatively, the composition can be used in cladding or costing operations.

BRIEF DESCRIPTION OF THE DRAWINGS (None)

DETAILED DESCRIPTION OF THE PREFERRED EMBODIMENTS

A novel composition is provided for fabricating a corrosion-resistant composite or surface coating having improved electrical conductivity. In the best mode of the invention, the composition is used to mold a unitary current collector plate for a polymer electrolyte membrane (PEM) fuel cell. However, the composition can be used to fabricate alternative collector plate structures as well. For instance, the composition can be coated onto the surface of a suitable substrate to form a multilayer collector plate structure. Accordingly, the term "structure" as used herein is intended to refer to either a unitary part or a coated part. Preferably, the composition comprises a low viscosity thermoplastic resin combined with a highly-conductive carbon or graphite filler material.

The composition is chosen to produce a current collector plate capable of withstanding the harsh environment of a PEM fuel cell. Preferably, the composition is used to fabricate a current collector plate meeting particular criteria listed in Table 1 (below). In addition to having the properties and characteristics identified below, it is preferred that the collector plate is resistant to chemical and electrochemical degradation and hydrolysis, and has a bulk electrical resistance less than 50 mΩ-cm (or a bulk conductivity greater than 20 S/cm).

TABLE 1

| Property | Test Method | Value | Comments |
|---|---|---|---|
| Bulk Resistance | 4-point probe | <50 mΩ-cm | |
| Bulk Density | | 1.5–2.25 g/cc | >2.25 (coated metals) |
| $H_2$ Permeability | | $<5(10)^{-6}$ cm/s | 90° C.; $202(10^3)N/m^2$ |
| Thermal Index | UL746B | >45° C. | tensile strength |

Suitable binder resins are defined as non-fluorinated thermoplastic or thermoset polymers preferably having melt viscosities of less than 1,000 Newton-seconds per square meter ($N*s/m^2$) over a shear rate range of 1,000 to 10,000 $sec^{-1}$, and additional material properties and characteristics defined in Table 2 (below). As used herein, the term "non-fluorinated" is intended to describe polymers other than fluoropolymers. Accordingly, nominal quantities of fluorine-containing components may be added to the present composition without changing the designation of the binder resin as a non-fluorinated polymer. For example, nominal quantities of TEFLON may be added to the binder resin to improve mold release characteristics of the final composition.

TABLE 2

| Property | Method | Value | Comments |
|---|---|---|---|
| Viscosity | Capillary Rheometry | <1,000 $N*s/m^2$ | over a sheer rate of 1,000–10,000 $sec^{-1}$ |
| Thermal index | UL746B | >45° C. | tensile strength |
| Hydrolytic Stability | | >80% property retention | 60° C. water; 1,000 hr |
| Particle Size | 60 mesh screen | >50% by wt. | <200 microns |
| $T_{HEAT\ DEFLECTION}$ | ASTM D648 | >75° C. | at $1.82(10)^6$ $N/m^2$ |
| $T_{MELTING}$ | | >90° C. | pref. 315–340° C. |
| Tensile Strength | ASTM D638 | $21–210(10)^6$ $N/m^2$ | pref. $>40(10)^6$ $N/m^2$ |
| Density | | 1.0–2.0 g/cc | |
| Water Absorption | ASTM D570 | <10% wt gain | 23° C.; 24 hours |

Particular examples of polymer resins which meet these requirements include, but are not limited to, polyphenylene sulfide (PPS), low molecular weight PPS, liquid crystal polymer (LCP), and modified polyphenylene oxide. Suitable polyphenylene sulfides are commercially available from Phillips Chemical Company of Bartlesville, Okla., under the trade name RYTON, and from Ticona Corporation of Summit, N.J., under the trade name FORTRON. Liquid crystal polymers having the desired properties are commercially available from Ticona under the trade name VECTRA, and from Amoco Performance Products, Inc. of Alpharetta, Ga., under the trade name XYDAR. A modified polyphenylene oxide having the desired properties is commercially available from General Electric Company of Pittsfield, Mass., under the trade name NORYL. Combinations of the above-identified polymer resins have the desired properties listed in Table 2.

Prior to being molded, the polymer resin is combined with highly conductive filler particles. Preferably, the filler particles comprise carbon and/or graphite and have properties and characteristics as defined below in Table 3.

TABLE 3

| Property | Method | Value | Comments |
|---|---|---|---|
| Carbon Content | — | >89% | ideal: >98% |
| Pressed Density | — | 1.8–2.0 $g/cm^3$ | at $44.8(10)^6$ $N/m^2$ |
| Particle Size | 200 mesh screen | >70% by wt. | ideal: >98% by wt. |
| Average Particle Size | — | 0.1–200 μm | ideal: 23–26 μm |
| Surface Area | BET | 5–50 $m^2/g$ | Ideal: 7–10 $m^2/g$ |
| Electrical Resistivity | — | <15 mΩ-cm | at $48(10)^6$ $N/m^2$ |

The filler may be provided in various forms, including powder, fiber and flake. However, it is preferred that the filler material comprises a high purity graphite powder having a carbon content of greater than 98 percent. The use of graphite is preferred because graphite is electrochemically stable in a wide range of environments. The use of a powder form is preferred because powders are less apt to impede the flow of the composition during molding. Preferably, the graphite powder has an average particle size of approximately 23–26 microns, and a BET-measured surface area of approximately 7–10 m$^2$/g. The incorporation of small, low surface area conductive particles in the novel composition of the present invention is a significant departure from conventional conductive composites used to fabricate structures for electronic, thermoelectric and electrochemnical devices, Conventional conductive composites, such as those used to fabricate fuel cell collector plates, typically contain conductive particles having a very high surface area combined with a small particle size. For Instance, carbon black particles having a surface area of greater than 500 m$^2$/g and a particle size of less than 1 micron are typical. Commonly, conventional conductive composites also contain large fibers having a low surface area. For instance, fibers having a surface area of less than 10 m$^2$/g coupled with a fiber length in excess of 250 microns are typical.

The combination of reduced filler particle size and reduced filler particle surface area provides a means for maintaining material flow while increasing filler particle loading. Significantly, the relatively low particle size and surface area enable greatly improved filler particle packing densities as compared to known compositions for molding current collector plates. A corresponding increase in solids loading results in a fabricated plate having increased electrical conductivity, while minimizing gas permeable voids. Graphite powders having the above-identified properties are available from UCAR Carbon Company, Inc. of Lawrenceburg, Tenn., as well as from Asbury Carbons, Inc. of Asbury, N.J.

Carbon nanofibers may be added to the composition to improve electrical conductivity and mechanical strength of the molded collector plate. The carbon nanofibers typically have diameters ranging from a few nanometers to several hundred nanometers, and aspect ratios ranging from 50 to 1,500. Further additives may include carbon fibers, metal fibers such as stainless steel or nickel, and/or metal-coated carbon fiber concentrates having polymer sizing chosen from the aforementioned group of potential polymers (i.e., polyphenylene sulfides, modified polyphenylene oxides, liquid crystal polymers, polyamides, polyimides, polyesters, phenolics, epoxy-containing resins, epoxy novolacs and vinyl esters).

The preferred composition contains 45–95 wt % graphite powder, 5–50 wt % polymer resin, and 0–20 wt % metallic fiber, carbon fiber and/or carbon nanofiber. Where metallic fibers are added, it is preferred that at least 50 percent of the fibers have diameters ranging from a few nanometers to about 50 microns, and aspect ratios ranging from 10 to 5,000.

The composition is formed into a composite having a desired geometry by compression molding, injection molding, or a combination thereof. In the case of compression molding, the graphite and polymer powders, and/or metal-coated carbon particles or fibers, are initially blended together to obtain a uniform distribution and composition. A preform of the mixed blend is created by compressing the blend using a pressure of 5–100(10)$^6$ N/m$^2$ at a temperature below the melting temperature of the polymer constituent, and preferably at room temperature. The preform is heated to a temperature greater than the polymer melting temperature for a period of approximately 1–45 minutes. Subsequently, the preform is placed between mold platens heated to a temperature in the range of 180–350° C. The mold platens are brought together at a clamping pressure of about 1–15(10)$^6$ N/m$^2$ and trapped gas within the mold Is removed by a degassing step in which a vacuum is applied. The degassing step takes approximately 1 minute. Following degassing, the mold clamping pressure is increased to about 5–75(10)$^6$ N/m$^2$. Subsequently, the mold is cooled to a temperature in the range of approximately 80–250° C., and the part is removed from the mold.

In the case of injection molding, the filler and polymer powders, and/or metal coated carbon particles or fibers, are initially blended together to obtain a uniform distribution and composition, compounded into pellets, and then plasticized prior to injection into a mold. Where injection molding is employed, the composition must be maintained at an adequate temperature (i.e., well above the melting temperature of the polymer resin) to prevent the resin from freezing, or solidifying, as it flows into and through the cooler mold. To further aid in preventing the resin from freezing during injection, the mold itself is preferably heated to a temperature of approximately 80–350° C. The mixture is rapidly injected into the mold to minimize heat loss due to the high thermal conductivity of the composition. Rapid injection also produces improved material flow into and through the mold by generating higher shear forces. Varying the injection pressure can affect the rate of injection. The injection pressure may vary depending upon a number of factors, such as composition viscosity, mold temperature, etc. However, it is preferred that the injection pressure is set at the maximum level that can be achieved without creating excessive mold flash. Mold flash occurs when the mold material is squeezed out of the mold cavity. Injection pressures may range from approximately 13–500(10)$^6$ N/m$^2$. The step of injection takes approximately 1–15 seconds. Following injection, the part may be retained in the mold prior to being ejected.

In a some instances, It may be desirable to employ a combination injection/compression molding process wherein the injection molded structure is subjected to a compression step following molding. This final compression step may, for instance, be employed to further enhance the conductivity of the molded structure by increasing the conductive filler packing density.

In an alternate embodiment of the invention, the novel composition is melted and applied to a metallic surface to provide a hardened, highly conductive protective layer upon cooling. The composition provides a means for protecting an underlying metallic structure from corrosion, while precluding a significant increase in electrical resistance. Structures suitable for fuel cell applications (i.e., having properties listed in Table 1) can be formed using numerous different coating methods. For instance, a coated structure can be formed by hot-dip coating thin, stamped or etched metal substrates into a melted form of the novel composition. Additional coating methods include cladding or hot roll coating a metal sheet, and subsequently hot stamping the coated surface to form a desired surface geometry.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A composition for forming an electrically conductive polymer composite for use in an electrochemical cell, comprising:
   a non-fluorinated thermoplastic binder having a melt viscosity of less than or equal to the lowest melt viscosity of a liquid crystal polymer over a shear rate range of 1,000 to 10,000 sec$^{-1}$; and
   a plurality of electrically conductive particles fixed in said thermoplastic binder, said composite having a bulk conductivity of at least approximately 10 S/cm.

2. A composition as recited in claim 1, wherein said non-fluorinated thermoplastic binder is a liquid crystal polymer.

3. A composition as recited in clam 1, wherein a tensile strength of said binder is greater than or equal to that of a liquid crystal polymer.

4. A composition as recited in claim 1, wherein a heat deflection temperature of said binder is greater than or equal to that of a liquid crystal polymer.

5. A composition for forming an electrically conductive polymer composite for use in an electrochemical cell, comprising:
a non-fluorinated thermoplastic binder having a ratio of melt temperature to melt viscosity of greater than or equal to said ratio for a liquid crystal polymer binder, wherein said melt viscosity is measured over a shear rate range of 1,000 to 10,000 sec$^{-1}$;
a heat deflection temperature of greater than or equal to a heat deflection temperature for a liquid crystal polymer binder, and
a plurality of electrically conductive particles fixed in said thermoplastic binder, said composite having a bulk conductivity of at least approximately 10 S/cm.

6. A composition for forming an electrically conductive polymer composite for use in an electrochemical cell, comprising:
a non-fluorinated thermoplastic binder having a ratio of melt temperature to melt viscosity of greater than or equal to said ratio for a liquid crystal polymer binder, wherein said melt viscosity is measured over a shear rate range of 1,000 to 10,000 sec$^{-1}$;
a tensile strength of greater than or equal to a tensile strength for a liquid crystal polymer binder, and
a plurality of electrically conductive particles fixed in said thermoplastic binder, said composite having a bulk conductivity of at least approximately 10 S/cm.

7. The composition of claim 5, wherein said ratio is greater than or equal to that of a liquid crystal polymer.

8. The composition of claim 5, wherein said heat deflection temperature is greater than or equal to that of a polyphenylene sulfide.

9. The composition of claim 6, wherein said ratio is greater than or equal to that of a liquid crystal polymer.

10. The composition of claim 6, wherein said tensile strength greater than or equal to that of a polyphenylene sulfide.

11. A composition for forming an electrically conductive polymer composite for use in an electrochemical cell, comprising:
a liquid crystal polymer binder, and
a plurality of electrically conductive particles fixed in said liquid crystal polymer binder, said composition having a bulk conductivity of at least approximately 10 S/cm.

12. A composition as recited in claim 1, wherein said plurality of electrically conductive particles comprise carbon particles.

13. A composition as recited in claim 12, wherein said electrically conductive particles include carbon fibers.

14. A composition as recited in claim 1, wherein said plurality of electrically conductive particles comprise graphite particles.

15. A composition as recited in claim 14, wherein said electrically conductive particles include graphite fibers.

16. A composition as recited in claim 1, wherein said plurality of electrically conductive particles have an average particle size in the range of about 0.1 to 200 microns, and preferably in the range of about 23 to 26 microns.

17. A composition as recited in claim 1, wherein said plurality of electrically conductive particles have a BET-measured average surface area in the range of about 1 to 100 m$^2$/g, and preferably in the range of about 7 to 10 m$^2$/g.

18. A composition as recited in claim 1, wherein said plurality of electrically conductive particles comprise at least 45 wt. % of said composition.

19. A composition as recited in claim 5, wherein said plurality of electrically conductive particles comprise carbon particles.

20. A composition as recited in claim 19, wherein said electrically conductive particles include carbon fibers.

21. A composition as recited in claim 5, wherein said plurality of electrically conductive particles comprise graphite particles.

22. A composition as recited in claim 21, wherein said electrically conductive particles include graphite fibers.

23. A composition as recited in claim 5, wherein said plurality of electrically conductive particles have an average particle size in the range of about 0.1 to 200 microns, and preferably in the range of about 23 to 26 microns.

24. A composition as recited in claim 5, wherein said plurality of electrically conductive particles have a BET-measured average surface area in the range of about 1 to 100 m$^2$/g, and preferably in the range of about 7 to 10 m$^2$/g.

25. A composition as recited in claim 5, wherein said plurality of electrically conductive particles comprise at least 45 wt. % of said composition.

26. A composition as recited in claim 6, wherein said plurality of electrically conductive particles comprise carbon particles.

27. A composition as recited in claim 26, wherein said electrically conductive particles include carbon fibers.

28. A composition as recited in claim 6, wherein said plurality of electrically conductive particles comprise graphite particles.

29. A composition as recited in claim 28, wherein said electrically conductive particles include graphite fibers.

30. A composition as recited in claim 6, wherein said plurality of electrically conductive particles have an average particle size in the range of about 0.1 to 200 microns, and preferably in the range of about 23 to 26 microns.

31. A composition as recited in claim 6, wherein said plurality of electrically conductive particles have a BET-measured average surface area in the range of about 1 to 100 m$^2$/g, and preferably in the range of about 7 to 10 m$^2$/g.

32. A composition as recited in claim 6, wherein said plurality of electrically conductive particles comprise at least 45 wt. % of said composition.

33. A composition as recited in claim 11, wherein said plurality of electrically conductive particles comprise carbon particles.

34. A composition as recited in claim 33, wherein said electrically conductive particles include carbon fibers.

35. A composition as recited in claim 11, wherein said plurality of electrically conductive particles comprise graphite particles.

36. A composition as recited in claim 35, wherein said electrically conductive particles include graphite fibers.

37. A composition as recited in claim 11, wherein said plurality of electrically conductive particles have an average particle size in the range of about 0.1 to 200 microns, and preferably in the range of about 23 to 26 microns.

38. A composition as recited in claim 11, wherein said plurality of electrically conductive particles have a BET-measured average surface area in the range of about 1 to 100 m$^2$/g, and preferably in the range of about 7 to 10 m$^2$/g.

39. A composition as recited in claim 11, wherein said plurality of electrically conductive particles comprise at least 45 wt. % of said composition.

40. A composition as recited in claim 1, wherein said plurality of electrically conductive particles have a carbon content of greater than approximately 98% and a pressed density of approximately 1.8-2.0 g/cm$^3$ at 44.8(10)$^6$ N/m$^2$.

41. A composition as recited in claim 5, wherein said plurality of electrically conductive particles have a carbon content of greater than approximately 98% and a pressed density of approximately 1.8-2.0 g/cm$^3$ at 44.8(10)$^6$ N/m$^2$.

42. A composition as recited in claim 6, wherein said plurality of electrically conductive particles have a carbon content of greater than approximately 98% and a pressed density of approximately 1.8-2.0 g/cm$^3$ at 44.8(10)$^6$ N/m$^2$.

43. A composition as recited in claim 11, wherein said plurality of electrically conductive particles have a carbon content of greater than approximately 98% and a pressed density of approximately 1.8-2.0 g/cm$^3$ at 44.8(10)$^6$ N/m$^2$.

44. A composition as recited in claim 1, wherein said bulk conductivity is at least 20 S/cm.

45. A composition as recited in claim 5, wherein said bulk conductivity is at least 20 S/cm.

46. A composition as recited in claim 6, wherein said bulk conductivity is at least 20 S/cm.

47. A composition as recited in claim 11, wherein said bulk conductivity is at least 20 S/cm.

48. A composition as recited in claim 1, wherein said electrically conductive particles comprise a powder.

49. A composition as recited in claim 48, wherein said powder consists essentially of carbon or graphite.

50. A composition as recited in claim 48, wherein said powder is substantially free of metallics.

51. A composition as recited in claim 50, wherein said powder consists essentially of carbon or graphite.

52. A composition as recited in claim 5, wherein said electrically conductive particles comprise a powder.

53. A composition as recited in claim 52, wherein said powder consists essentially of carbon or graphite.

54. A composition as recited in claim 52, wherein said powder is substantially free of metallics.

55. A composition as recited in claim 54, wherein said powder consists essentially of carbon or graphite.

56. A composition as recited in claim 6, wherein said electrically conductive particles comprise a powder.

57. A composition as recited in claim 56, wherein said powder consists essentially of carbon or graphite.

58. A composition as recited in claim 56, wherein said powder is substantially free of metallics.

59. A composition as recited in claim 58, wherein said powder consists essentially of carbon or graphite.

60. A composition as recited in claim 11, wherein said electrically conductive particles comprise a powder.

61. A composition as recited in claim 60, wherein said powder consists essentially of carbon or graphite.

62. A composition as recited in claim 60, wherein said powder is substantially free of metallics.

63. A composition as recited in claim 62, wherein said powder consists essentially of carbon or graphite.

64. A composition as recited in claim 48, wherein said plurality of electrically conductive particles have an average particle size in the range of about 0.1 to 200 microns, and preferably in the range of about 23 to 26 microns.

65. A composition as recited in claim 48, wherein said plurality of electrically conductive particles have a BET-measured average surface area in the range of about 1 to 100 m$^2$/g, and preferably in the range of about 7 to 10 m$^2$/g.

66. A composition as recited in claim 52, wherein said plurality of electrically conductive particles have an average particle size in the range of about 0.1 to 200 microns, and preferably in the range of about 23 to 26 microns.

67. A composition as recited in claim 52, wherein said plurality of electrically conductive particles have a BET-measured average surface area in the range of about 1 to 100 m$^2$/g, and preferably in the range of about 7 to 10 m$^2$/g.

68. A composition as recited in claim 56, wherein said plurality of electrically conductive particles have an average particle size in the range of about 0.1 to 200 microns, and preferably in the range of about 23 to 26 microns.

69. A composition as recited in claim 56, wherein said plurality of electrically conductive particles have a BET-measured average surface area in the range of about 1 to 100 m$^2$/g, and preferably in the range of about 7 to 10 m$^2$/g.

70. A composition as recited in claim 60, wherein said plurality of electrically conductive particles have an average particle size in the range of about 0.1 to 200 microns, and preferably in the range of about 23 to 26 microns.

71. A composition as recited in claim 60, wherein said plurality of electrically conductive particles have a BET-measured average surface area in the range of about 1 to 100 m$^2$/g, and preferably in the range of about 7 to 10 m$^2$/g.

72. A current collector plate for use in fuel cells, said fuel cells having an ion conducting medium adjacent to an anode and a cathode, and a gas diffusion layer adjacent to said anode and cathode, said current collector plate comprising:
   a collector plate body formed to provide at least one surface for interfacing with one of said gas diffusion layers;
   a non-fluorinated thermoplastic binder having a melt viscosity of less than or equal to the lowest melt viscosity of a liquid crystal polymer over a shear rate range of 1,000 to 10,000 sec$^{-1}$; and
   a plurality of electrically conductive particles fixed in said thermoplastic binder, said composite having a bulk conductivity of at least approximately 10 S/cm.

73. The current collector plate as recited in claim 72, wherein said plurality of electrically conductive particles have a carbon content of greater than approximately 98% and a pressed density of approximately 1.8-2.0 g/cm$^3$ at 44.8(10)$^6$ N/m$^2$.

74. A current collector plate as recited in claim 72, wherein said non-fluorinated thermoplastic binder is a liquid crystal polymer.

75. A current collector plate as recited in claim 72, wherein a tensile strength of said binder greater than or equal to that of a liquid crystal polymer.

76. The current collector plate as recited in claim 72, wherein a heat deflection temperature of said binder is greater than or equal to that of a liquid crystal polymer.

77. A current collector plate for use in fuel cells, said fuel cells having an ion conducting medium adjacent to an anode and a cathode, and a gas diffusion layer adjacent to said anode and cathode, said current collector plate comprising:
   a collector plate body formed to provide at least one surface for interfacing with one of said gas diffusion layers;
   a non-fluorinated thermoplastic binder having a ration of melt temperature to melt viscosity of greater than or equal to said ratio for a liquid polymer binder, wherein said melt viscosity is measured over a shear rate range of 1,000 to 10,000 sec$^{-1}$;
   a heat deflection temperature of greater than or equal to a heat deflection temperature for a liquid crystal polymer binder, and a plurality of electrically conductive particles fixed in said thermoplastic binder, said composite having a bulk conductivity of at least approximately 10 S/cm.

78. The current collector plate as recited in claim 77, wherein said plurality of electrically conductive particles have a carbon content of greater than approximately 98% and a pressed density of approximately 1.8-2.0 g/cm$^3$ at 44.8(10)$^6$ N/m$^2$.

79. A current collector plate for use in fuel cells, said fuel cells having an ion conducting medium adjacent to an anode and a cathode, and a gas diffusion layer adjacent to said anode and cathode, said current collector plate comprising:
a collector plate body formed to provide at least one surface for interfacing with one of said gas diffusion layers;
a non-fluorinated thermoplastic binder having a ration of melt temperature to melt viscosity of greater than or equal to said ration for a liquid crystal polymer binder, wherein said melt viscosity is measured over a shear rate range of 1,000 to 10,000 sec$^{-1}$;
a tensile strength of greater than or equal to a tensile strength for liquid crystal polymer binder, and
a plurality of electrically conductive particles fixed in said thermoplastic binder, said composite having a bulk conductivity of at least approximately 10 S/cm.

80. The current collector plate as recited in claim 79, wherein said plurality of electrically conductive particles have a carbon content of greater than approximately 98% and a pressed density of approximately 1.8-2.0 g/cm$^3$ at 44.8(10)$^6$N/m$^2$.

81. A current collector plate for use in fuel cells, said fuel cells having an ion conducting medium adjacent to an anode and a cathode, and a gas diffusion layer adjacent to said anode and cathode, said current collector plate comprising:
a collector plate body formed to provide at least one surface for interfacing with one of said gas diffusion layers;
a liquid crystal polymer binder, and
a plurality of electrically conductive particles fixed in said liquid crystal polymer binder, said composition having a bulk conductivity of at least approximately 10 S/cm.

82. The current collector plate as recited in claim 81, wherein said plurality of electrically conductive particles have a carbon content of greater than approximately 98% and a pressed density of approximately 1.8-2.0 g/cm$^3$ at 44.8(10)$^6$N/m$^2$.

83. The current collector plate as recited in claim 72, wherein said plurality of electrically conductive particles comprise carbon particles.

84. The current collector plate as recited in claim 83, wherein said electrically conductive particles include carbon fibers.

85. The current collector plate as recited in claim 72, wherein said plurality of electrically conductive particles comprise graphite particles.

86. The current collector plate as recited in claim 85, wherein said electrically conductive particles include graphite fibers.

87. The current collector plate as recited in claim 72, wherein said plurality of electrically conductive particles have an average particle size in the range of about 0.1 to 200 microns, and preferably in the range of about 23 to 26 microns.

88. The current collector plate as recited in claim 72, wherein said plurality of electrically conductive particles have a BET-measured average surface area in the range of about 1 to 100 m$^2$/g, and preferably in the range of about 7 to 10 m$^2$/g.

89. The current collector plate as recited in claim 72, wherein said plurality of electrically conductive particles comprise at least 45 wt. % of said composition.

90. The current collector plate as recited in claim 77, wherein said plurality of electrically conductive particles comprise carbon particles.

91. The current collector plate as recited in claim 90, wherein said electrically conductive particles include carbon fibers.

92. The current collector plate as recited in claim 77, wherein said plurality of electrically conductive particles comprise graphite particles.

93. The current collector plate as recited in claim 92, wherein said electrically conductive particles include graphite fibers.

94. The current collector plate as recited in claim 77, wherein said plurality of electrically conductive particles have an average particle size in the range of about 0.1 to 200 microns, and preferably in the range of about 23 to 26 microns.

95. The current collector plate as recited in claim 77, wherein said plurality of electrically conductive particles have a BET-measured average surface area in the range of about 1 to 100 m$^2$/g, and preferably in the range of about 7 to 10 m$^2$/g.

96. The current collector plate as recited in claim 77, wherein said plurality of electrically conductive particles comprise at least 45 wt. % of said composition.

97. The current collector plate as recited in claim 79, wherein said plurality of electrically conductive particles comprise carbon particles.

98. The current collector plate as recited in claim 97, wherein said electrically conductive particles include carbon fibers.

99. The current collector plate as recited in claim 79, wherein said plurality of electrically conductive particles comprise graphite particles.

100. The current collector plate as recited in claim 99, wherein said electrically conductive particles include graphite fibers.

101. The current collector plate as recited in claim 79, wherein said plurality of electrically conductive particles have an average particle size in the range of about 0.1 to 200 microns, and preferably in the range of about 23 to 26 microns.

102. The current collector plate as recited in claim 79, wherein said plurality of electrically conductive particles have a BET-measured average surface area in the range of about 1 to 100 m$^2$/g, and preferably in the range of about 7 to 10 m$^2$/g.

103. The current collector plate as recited in claim 79, wherein said plurality of electrically conductive particles comprise at least 45 wt. % of said composition.

104. The current collector plate as recited in claim 81, wherein said plurality of electrically conductive particles comprise carbon particles.

105. The current collector plate as recited in claim 104, wherein said electrically conductive particles include carbon fibers.

106. The current collector plate as recited in claim 81, wherein said plurality of electrically conductive particles comprise graphite particles.

107. The current collector plate as recited in claim 106, wherein said electrically conductive particles include graphite fibers.

108. The current collector plate as recited in claim 81, wherein said plurality of electrically conductive particles have an average particle size in the range of about 0.1 to 200 microns, and preferably in the range of about 23 to 26 microns.

109. The current collector plate as recited in claim 81, wherein said plurality of electrically conductive particles have a BET-measured average surface area in the range of about 1 to 100 $m^2/g$, and preferably in the range of about 7 to 10 $m^2/g$.

110. The current collector plate as recited in claim 81, wherein said plurality of electrically conductive particles comprise at least 45 wt. % of said composition.

111. The current collector plate as recited in claim 72, wherein said bulk conductivity is at least 20 S/cm.

112. The current collector plate as recited in claim 77, wherein said bulk conductivity is at least 20 S/cm.

113. The current collector plate as recited in claim 79, wherein said bulk conductivity is at least 20 S/cm.

114. The current collector plate as recited in claim 81, wherein said bulk conductivity is at least 20 S/cm.

115. A composition as recited in claim 72, wherein said electrically conductive particles comprise a powder.

116. A composition as recited in claim 115, wherein said powder consists essentially of carbon or graphite.

117. A composition as recited in claim 115, wherein said powder is substantially free of metallics.

118. A composition as recited in claim 117, wherein said powder consists essentially of carbon or graphite.

119. A composition as recited in claim 77, wherein said electrically conductive particles comprise a powder.

120. A composition as recited in claim 119, wherein said powder consists essentially of carbon or graphite.

121. A composition as recited in claim 119, wherein said powder is substantially free of metallics.

122. A composition as recited in claim 121, wherein said powder consists essentially of carbon or graphite.

123. A composition as recited in claim 79, wherein said electrically conductive particles comprise a powder.

124. A composition as recited in claim 117, wherein said powder consists essentially of carbon or graphite.

125. A composition as recited in claim 123, wherein said powder is substantially free of metallics.

126. A composition as recited in claim 125, wherein said powder consists essentially of carbon or graphite.

127. A composition as recited in claim 81, wherein said electrically conductive particles comprise a powder.

128. A composition as recited in claim 127, wherein said powder consists essentially of carbon or graphite.

129. A composition as recited in claim 127, wherein said powder is substantially free of metallics.

130. A composition as recited in claim 129, wherein said powder consists essentially of carbon or graphite.

131. A composition as recited in claim 115, wherein said plurality of electrically conductive particles have an average particle size in the range of about 0.1 to 200 microns, and preferably in the range of about 23 to 26 microns.

132. A composition as recited in claim 115, wherein said plurality of electrically conductive particles have a BET-measured average surface area in the range of about 1 to 100 $m^2/g$, and preferably in the range of about 7 to 10 $m^2/g$.

133. A composition as recited in claim 119, wherein said plurality of electrically conductive particles have an average particle size in the range of about 0.1 to 200 microns, and preferably in the range of about 23 to 26 microns.

134. A composition as recited in claim 119, wherein said plurality of electrically conductive particles have a BET-measured average surface area in the range of about 1 to 100 $m^2/g$, and preferably in the range of about 7 to 10 $m^2/g$.

135. A composition as recited in claim 123, wherein said plurality of electrically conductive particles have an average particle size in the range of about 0.1 to 200 microns, and preferably in the range of about 23 to 26 microns.

136. A composition as recited in claim 123, wherein said plurality of electrically conductive particles have a BET-measured average surface area in the range of about 1 to 100 $m^2/g$, and preferably in the range of about 7 to 10 $m^2/g$.

137. A composition as recited in claim 127, wherein said plurality of electrically conductive particles have an average particle size in the range of about 0.1 to 200 microns, and preferably in the range of about 23 to 26 microns.

138. A composition as recited in claim 127, wherein said plurality of electrically conductive particles have a BET-measured average surface area in the range of about 1 to 100 $m^2/g$, and preferably in the range of about 7 to 10 $m^2/g$.

\* \* \* \* \*

UNITED STATES PATENT AND TRADEMARK OFFICE
CERTIFICATE OF CORRECTION

PATENT NO. : 6,180,275 B1
DATED : January 30, 2001
INVENTOR(S) : Braun et al.

Page 1 of 1

It is certified that error appears in the above-identified patent and that said Letters Patent is hereby corrected as shown below:

1. Cancel Claims 7-10.

2. <u>Claim 79, column 11,</u>
   Line 16, change "ration" to "ratio".

3. Line 18, change "ration" to "ratio".

Signed and Sealed this

Twenty-eighth Day of August, 2001

*Attest:*

NICHOLAS P. GODICI
*Attesting Officer*  *Acting Director of the United States Patent and Trademark Office*